United States Patent [19]

Nahaboo et al.

[11] Patent Number: 5,974,253
[45] Date of Patent: Oct. 26, 1999

[54] USING AN EMBEDDED INTERPRETED LANGUAGE TO DEVELOP AN INTERACTIVE USER-INTERFACE DESCRIPTION TOOL

[75] Inventors: Colas Nahaboo, Chemin de la Tire; Vincent Bouthors, Mougins, both of France

[73] Assignee: Bull S.A., Puteaux, France

[21] Appl. No.: 08/936,325

[22] Filed: Sep. 24, 1997

Related U.S. Application Data

[63] Continuation of application No. 08/211,133, filed as application No. PCT/FR93/00749, Jul. 21, 1993, Pat. No. 5,696,914.

[30] Foreign Application Priority Data

Jul. 22, 1992 [FR] France .................................. 92 09057

[51] Int. Cl.$^6$ .............................. G06F 9/44; G06T 11/60
[52] U.S. Cl. ......................... 395/701; 395/705; 345/333; 345/346; 345/353; 345/438
[58] Field of Search ..................................... 395/701, 705; 709/302; 345/333, 346, 353, 326, 433, 438

[56] References Cited

U.S. PATENT DOCUMENTS

| | | | |
|---|---|---|---|
| 4,811,240 | 3/1989 | Ballou et al. | 345/334 |
| 5,206,951 | 4/1993 | Khoyi et al. | 709/303 |
| 5,243,697 | 9/1993 | Hoeber et al. | 345/334 |

FOREIGN PATENT DOCUMENTS 0395606  10/1990   European Pat. Off. .

OTHER PUBLICATIONS

Miranker et al, "The C++ embeddable rule system," TAI '91, Third International Conference on Tools for Artificial Intelligence, pp. 386–393, Nov. 1991.

Vick et al, "Tools and techniques for the development of Common Lisp applications across heterogeneous machines," System Integration '90, Proceedings of the First International Conference on System Integration, pp. 76–85, Apr. 1990.

Gardarin et al, "Extending a relational DBMS to support complex objects," Second International Conference on Data and Knowledge Systems for Manufacturing and Engineering, pp. 131–137, Oct. 1989.

The Visual Computer, "Environment for Rapidly Creating Interactive Design Tools", B.A. Myers, et al, vol. 8, No. 2, Feb. 1992, pp. 94–116.

"A User Interface Construction Environment with Editors as Software Parts", H. Tarumi, et al, NEC Research and Development, No. 98, Jul. 1990, Tokyo, Japan, pp. 89–97.

"X Widget Based Software Tools for Unix", Doug Blewett, et al, Proceedings of the Winter 1992 USENIX Conference, Jan. 20, 1992, Berkeley, California, pp. 111–123.

"Table–Driven Method for Option Processing", Research Disclosure, No. 319, Nov. 1990, Emsworth, GB, p. 863, (31916).

*Primary Examiner*—Tariq R. Hafiz
*Assistant Examiner*—Than Q. Dam
*Attorney, Agent, or Firm*—Weingarten, Schurgin, Gagnebin & Hayes LLP

[57] ABSTRACT

This invention concerns an interactive interface description tool that uses an interpreted language in which both the data and the programs have a similar representation. This tool also has an interpreter that is embedded with the interface description program. This interpreter consists of a mixture of "C" language and interpreted language instructions and uses a library ("X/MOTIF") of interactive command objects ("widget") and a library of graphical objects ("GO").

12 Claims, 5 Drawing Sheets

USING AN EMBEDDED INTERPRETED LANGUAGE TO DEVELOP AN INTERACTIVE USER-INTERFACE DESCRIPTION TOOL

This application is a continuation of application Ser. No. 08/211,133, filed as PCT/FR93/00749, Jul. 21, 1993, is now 5696914.

FIELD OF THE INVENTION

This invention is related to interactive user-interface description tool using an embedded interpreted language.

BACKGROUND OF THE INVENTION

Interactive software has very specific constraints. The most important limitation is that they can be changed very often. In fact, for ergonomic reasons, it is difficult to develop programs that are user-friendly and ready for marketing in a single try. The first version is almost always a failure and needs numerous revisions and modifications.

Moreover, it may be desirable or necessary to change the way an operation is activated by adapting it to a different context or to a different user.

Finally, a good program that uses a bad interface can expect to have mitigated commercial success.

SUMMARY OF THE INVENTION

The purpose of this invention is to define an extremely flexible interface development tool that can be used regardless of the application. For example, this interface has been developed for UNIX systems using X/WINDOW and X/MOTIF which are registered trademarks of M.I.T. and the Open Software Foundation respectively.

This goal is attained because the interactive interface description tool uses a LISP-type interpreted language and because the interpreter (WOOL) is embedded with the application's interface description program and with the application produced.

Another feature of this invention is that both the data and the programs have a similar representation.

Another feature of this invention is that the description program contains a library "X/MOTIF" of interactive command objects "Widgets" and a library of graphical objects "GO".

Another feature of this invention is that the application program consists of a mixture of instructions. Some of these instructions are written in the C language. C is a high-level portable assembler that manipulates objects. The other instructions are written in an interpreted language.

Another feature of this invention is that the interpreter is object-oriented in the LISP language.

Another feature of this invention is that the interpreter uses arrays.

Another feature of this invention is that the interpreter kernel is organized as a two-dimensional matrix. The first dimension contains the lists, the strings and the numbers. The second dimension contains the selector with functions such as "eval, print, free, add, . . . ".

Another feature of this invention is that the WOOL interpreter includes a garbage collector (GC) that periodically scans the memory for unused objects whose space can be reused. This is accomplished without interrupting use of the interpreter.

Another feature of this invention is that the garbage collector (GC) is incremental.

Another feature of this invention is that the garbage collector uses reference counters and a mechanism that sorts the objects by size in order to limit memory fragmentation.

Another feature of this invention is that the functions of the interactive tool are described using an interpreted program.

Another feature of this invention is that storage of the interface format is edited and executed in the same manner as a WOOL program.

Another feature of this invention is that the interactive assembly geometry specification of these objects is translated into a file that is used by an application and can be stored on disk. This file will contain the user-interface format in the form of a WOOL language program.

Another feature of this invention is that the dynamic behavior of the interactive objects ("widgets") is defined by a set of callback procedures written in the "WOOL" language. These procedures designate the application functions called by the "X/MOTIF" toolkit when an entry flag is received.

Another feature of this invention is that the interface description program can be expanded by adding other "widget" classes. These classes can be added by describing the new attribute types of each class in the WOOL language so that the new "widgets" can be edited.

Another feature of this invention is that each "widget" is indicated by a "WOOL" object of the "WOOL" class that corresponds to the "widget's" class. Supplementary attributes are attached directly to the "WOOL" object.

Another feature of this invention is that each WOOL object is an auto-typed structure written in the C language containing the object type and the reference counter information.

Another feature of this invention is that a unique "WOOL" identifier is assigned to each interactive object "widget" in an incremental fashion.

Another feature of this invention is that the interactive interface description tool "EGERIA" includes a program that allows a base menu to be displayed. This menu contains an editing function "edit", a creation function "create" and a geometry function "geometry".

Another feature of this invention is that the creation function "create" allows the user to create any "widget" from a menu. After selecting a menu line, the shape of the cursor changes and by clicking the mouse on an interactive object container "widget container", the object type that is selected in this interactive object container will be installed.

Another feature of this invention is that the editing function "edit" allows the user to edit the attributes of a "widget" in a separate window. The user can cut, paste, copy or duplicate the set of selected "widgets" as well as edit the attributes of parent "widgets" of a selected "widget" or make the parent of a currently selected "widget" the new selected "widget".

Another feature of this invention is that the geometry function "geometry" allows the user to control the geometry of a set of selected "widgets". These "widgets" can be aligned to the top, to the bottom, to the right side, to the left side or have identical heights or widths.

Another feature of this invention is that the editing function allows the user to display a "widget" attribute editing window that is divided into two sections. One section includes the functions that are called from the application of callback procedures and the other contains the attributes created by a set of sub-editors.

Another feature of this invention is that the first sub-editor consists of a toggle button used to enter boolean attributes.

Another feature of this invention is that the second sub-editor consists of a push button that displays a menu containing lists of enumerated-type values (ex. alignment of a text to the left, to the right or in the center).

Another feature of this invention is that the third sub-editor consists of a text area where text or numerical values are entered.

Another feature of this invention is that the editing function of MOTIF-type interactive objects "Shell widgets" represents a first-level window (X/Windows) and is activated by selecting the "select parent" menu and then the "edit attribute" function.

DESCRIPTION OF THE DRAWINGS

Other characteristics and advantages of this invention will become evident in the following explanations and descriptions. These descriptions are aided by the enclosed drawings in which.

DETAILED DESCRIPTION OF THE INVENTION

Figure 1A:
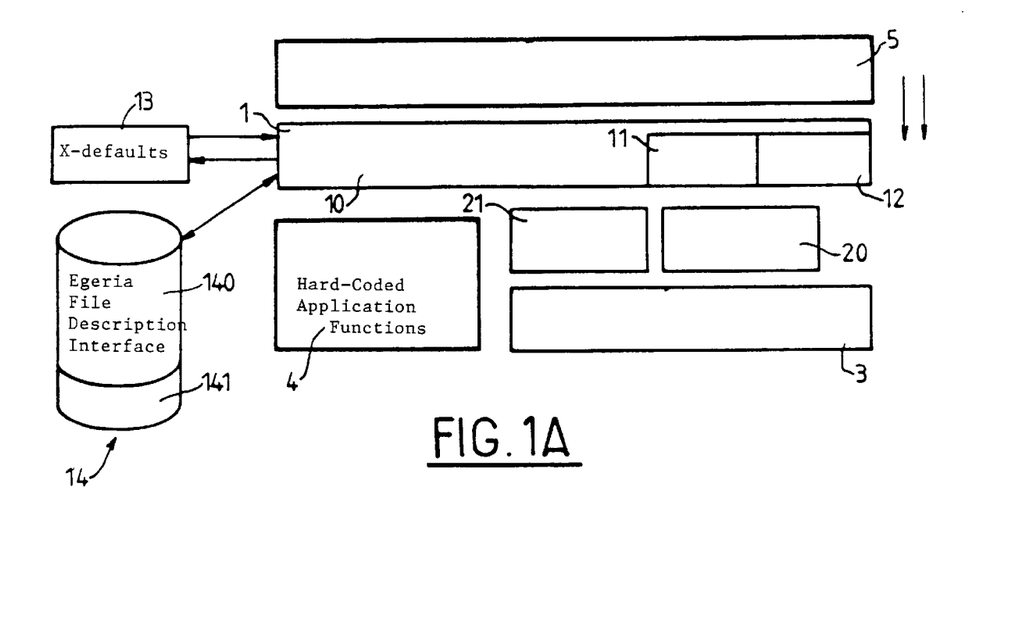
FIG. 1A is a schematic representation of the architecture of the interface description software.

The interactive interface description tool "EGERIA" illustrated in FIG. 1 contains:

an editor that allows the user to create or modify an interface (10), an interpreter library "WOOL.LIB" (11) that uses link editing with the application to produce the complete application, an editor library "Edit.LIB" (12) that uses link editing with the application code to produce an editor that enables real-time execution of the application functions. These two libraries "WOOL.LIB" and "Edit.LIB" are both provided in the "libEg.a" library.

In order to function, this interactive description interface (10) must be associated with a library of interactive command objects (called command object toolbox "X/MOTIF" (20) in the UNIX environment) and a graphical object toolbox that includes a library of graphical objects "GO" (21). This powerful library is written in the C++ language and provides graphic functions that are not available in the UNIX environment at this time. This library also allows the user to create and control rectangles, ellipses, polygonal lines, images and text that can be edited in several fonts.

The description tool also includes a library "Xlib" (3) consisting of a protocol layer specifying the information flow coding that cycles between the application, the windowing server and the library layer containing the program interface. This allows the user to access the windowing system.

EGERIA (10) covers the format layer that describes a set of objects in an interface in a static manner. In other words, it describes their hierarchy, their attribute and the dialogue layer. This layer describes the dynamic aspect of the interface's behavior.

Finally, a supplementary layer (5) is formed by the application. This layer includes the semantic layer container and does not include the interface in the application.

The "WOOL.LIB" (11) interpreter is a small LISP interpreter written in the C language. In this interface, memory is controlled by a reference counter. This counter uses internal-typing that sends messages conforming to an object-oriented approach in order to verify the type and activate the procedure.

The interpreter provides a set of database types such as atom, list, whole number, real number and character string.

The "WOOL.LIB" (11) interpreter uses arrays to store lists in order to accelerate list scanning.

This set of base types is expandable because a new base type such as a "widget" can be introduced. The new base type will allow the user to manipulate "MOTIF" objects in "WOOL".

Figure 1B:
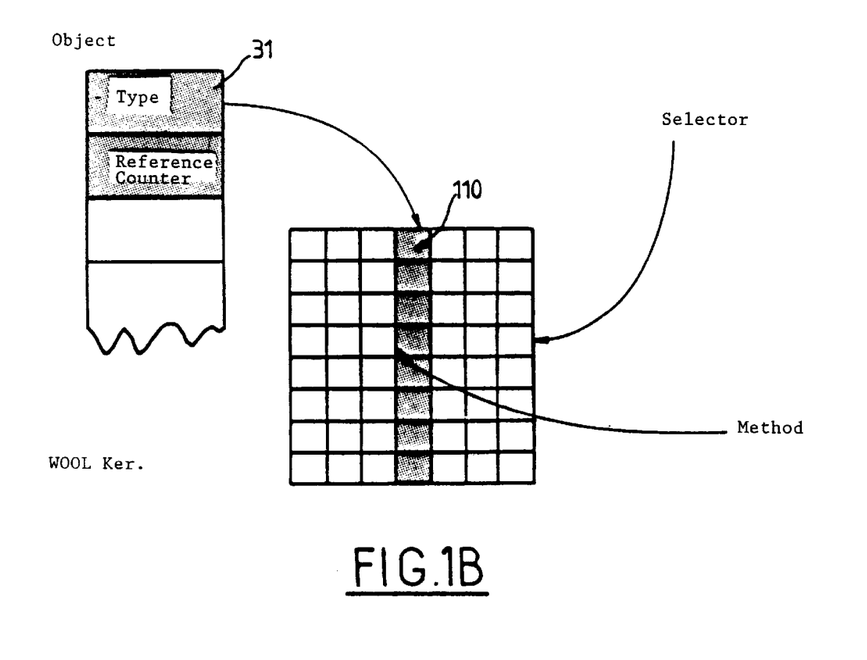
FIG. 1B is a schematic representation of a kernel structure of the interface description software of FIG. 1A.

As illustrated in FIG. 1B, each "WOOL" object consists of a header. This header points to the reference counter (Ref Cnt), to the class corresponding to the object's type (31) as well as to other information (attributes) depending on the type of object. Each "widget" object is assigned an identifier in an incremental manner.

Each widget that is created by EGERIA is assigned a unique identifier such as "@000012@".

The uniqueness of this identifier is guaranteed throughout the EGERIA session. If these references are used in "WOOL", for callback text that is attached to the widgets, a save (or a cut) followed by a restore (or a paste) will preserve the mutual coherence of the references. However, if the mutual references are produced in "WOOL" using atoms, an atom will have only one value and the two callbacks will refer to the same widget.

The use of unique widget identifiers in the dialogue code allows the user to construct windows whose behaviors can easily be duplicated. For example, the behaviors can be duplicated using an interactively edited window with a button and text. The callback assigned to the button is the following:

(onXmactivateCallback (widget) (widget-unmap @00002@))

When the button is pressed during execution mode, the text disappears. The purpose of the "unmap" command is to make the widget specified by its argument invisible.

If the window is duplicated during a cut/paste operation, the behavior will also be duplicated and EGERIA changes the callback code assigned to the duplicated button as follows:

(on XmNactivateCallback (widget) (widget-unmap @00005@))

where @00005@ is the unique identifier generated by the duplicated text.

This procedure allows the user to avoid having to manually change the callback code during an application.

The object type allows the user to access a class (110) containing a list of methods in the "WOOL" interpreter kernel (WOOL KERNEL). Each method is a function such as "Print". Thus, the "Print" function of an object will be adapted to the type of object processed. Classes consist of the matrix array columns shown in FIG. 1B and the array's line methods. The list of methods is embedded in the WOOL.LIB interpreter. In other words, it is released using the editor (refer to Appendix 6).

In the "WOOL.LIB" (11) interpreter, an atom can only have one value, while in traditional LISP languages, a variable and a function can be given the same name without conflict.

This interpreter uses a set of "Lisp" primitives that are easily expandable.

Finally, the "WOOL.LIB" interpreter is written in an object-orientated manner and the objects are classified or typed internally by the interpreter.

Another characteristic of the interpreter is that it is re-enterable. This means that a function that is activated by it can reactivate an interpretation that will have access to the same WOOL data stack.

A garbage collector, formed using the old reference counting method, required additional precaution when the auto-referencing structures were created. The "WOOL.LIB" interpreter includes a garbage collector (GC) that periodically and in a cyclic manner, scans the memory for unused objects whose space can be reused. This is accomplished without interrupting use of the interpreter. This garbage collector (GC) is incremental. The garbage collector uses reference counters which allow any size object to be allocated and a mechanism that sorts the objects by size in order to limit memory fragmentation.

The "WOOL.LIB" interpreter activates a garbage collector (GC) that allows unused memory to be automatically recuperated. Because of this, the programmer does not need to worry about assigning or unassigning objects that are used. This type of system makes more rapid programming possible because the programs do not have to contain code that can be laborious to create or to verify and which usually concerns memory management.

The "WOOL.LIB" garbage collector is incremental in-that it operates continuously and on low data volumes. However, traditional garbage collectors are only called occasionally in order to recuperate a large volume of memory. In this case, the period during which the garbage collector (GC) is active translates into a perceptible pause in the program currently being interpreted. This can be very inconvenient for the user of an interactive program. An incremental garbage collector (GC) guarantees that interpretation takes places smoothly. The increase in speed is due to the fact that the garbage collector (GC) is uniformly divided by the execution set of the interpreted program.

The incrementation characteristic of the "WOOL.LIB" garbage collector (GC) is obtained by:

maintaining a reference counter for each object assigned. This object will not be released until this counter reaches zero.

considering that the majority of the assigned objects are, in fact, unassigned very rapidly after their creation. After all of the instructions contained in a sequence of expressions have been executed, a special area is scanned to find such objects at regular intervals.

The names that EGERIA gives to the "X/MOTIF" widgets are compatible with the conventions imposed by X/Windows and X/Motif. This allows the interface to be divided into parameters (default file X, option to run programs).

The coding in EGERIA contains references necessary for link editing.

When using EGERIA with the "X/MOTIF" (20) toolkit, the following items are usually included in the EGERIA (10) code:

the description of the base types ("widget", callback procedure, etc. . . . , for example XmTopLevelShell, (see (40) in Appendix 4), the interface object classes (push button, scrollbar, menubar, etc. . . . ) and the primitives (toolkit-init, create "widget", etc. . . . for example: on XmNinput-Callback of the "widget" XmDrawingArea, (see (432) Appendix 4), the different kinds of base types (enumerated, dimension, etc. . . . , for example: XmNwidth of XmTopLevelShell), the attributes that are unique to each class.

High level functions that are written using primitives will be placed in the external file (14). This allows the user to add new interface object classes.

The EGERIA (10) structure is characterized by a main entry scanning loop that distributes the events (mouse click, keyboard entry) received by different program components. One example of such a loop (refer to 511 in Appendix 5) is used in the application example given in the continuation of Appendices 4 and 5.

The "WOOL.LIB" interpreter does not contain the main application loop. The application (5) maintains control of this loop.

This loop is designed to call the scanning function Motif and then distribute the entry received. This means that a level of programming exists in which the user can choose the entity responsible for processing each X/Windows event and therefore for each "Motif" event. "Motif" may call the callback procedure defined by the "widget" assigned to the event or by another component such as EGERIA.

When described by EGERIA, a callback such as "callback dog:draw" written in LISP (see 435 in Appendix 4) or "call-back dog:step" (see 4412 in Appendix 4) is created by calling the main entry point (530 and 531 respectively, Appendix 5) of the "WOOL.LIB" interpreter that is going to execute the associated method (523 and 525 respectively, Appendix 5). This interpreter is written in the C language and processes as fast as possible.

Finally, using a hybrid system that operates in the LISP and C languages, causes certain conversion problems when converting C function parameters to LISP and from LISP to C. The solution is to use natural C structures for the LISP system whenever possible. But, these structures must be prefixed with a header in the "WOOL" language (for example 522, Appendix 5).

FIG. 1B represents the kernel structure (WOOL KERNEL) that is organized according to an array in which each column corresponds to one object type. An object is referenced by its type and this allows the user to access the message processing method that can process the object.

In the execution mode, the "WOOL.LIB" (11) interpreter is responsible for loading the interface description file (13) that includes annex 4, when this interface has been created. "WOOL.LIB" executes this interface description file (14) as a WOOL language program in order to reconstruct the application interface and then interpret all the events that arise from the MOTIF toolkit. Then, the system will react in a purely dynamic manner in the interface without restarting the application or it will send the event to the application using an entry point of the application as an intermediary.

The EGERIA editor (10) has essentially two operating modes: editing and execution.

In the editing mode, the application interface can easily be modified and the execution mode allows the user to test the behavior of the interface.

Finally, if the editor that is used causes link editing of the editor library (12) with the application (5), then the application functions are called.

In order to edit objects, the program uses the traditional functions: create, cut, copy, paste, edit, attributes such as undo, as well as other important new features such as the FORM EDITOR, the Attribute Editor and the object hierarchy. The "widget" objects can be organized into two categories, elementary objects and "container widgets" that can contain several objects. Some containers, such as interactive shell objects ("shell widgets"), have a container and are created at the first level (for example, "Top Level Shell" as listed in Appendix 4).

A MOTIF FORM widget is a "container" widget whose children are automatically positioned or resized when the FORM widget is resized. The interactive specification of the behavior of a child of such a widget is fulfilled using a special formula or "FORM EDITOR" that allows the user to easily define the set of behaviors provided by MOTIF.

Figure 3:
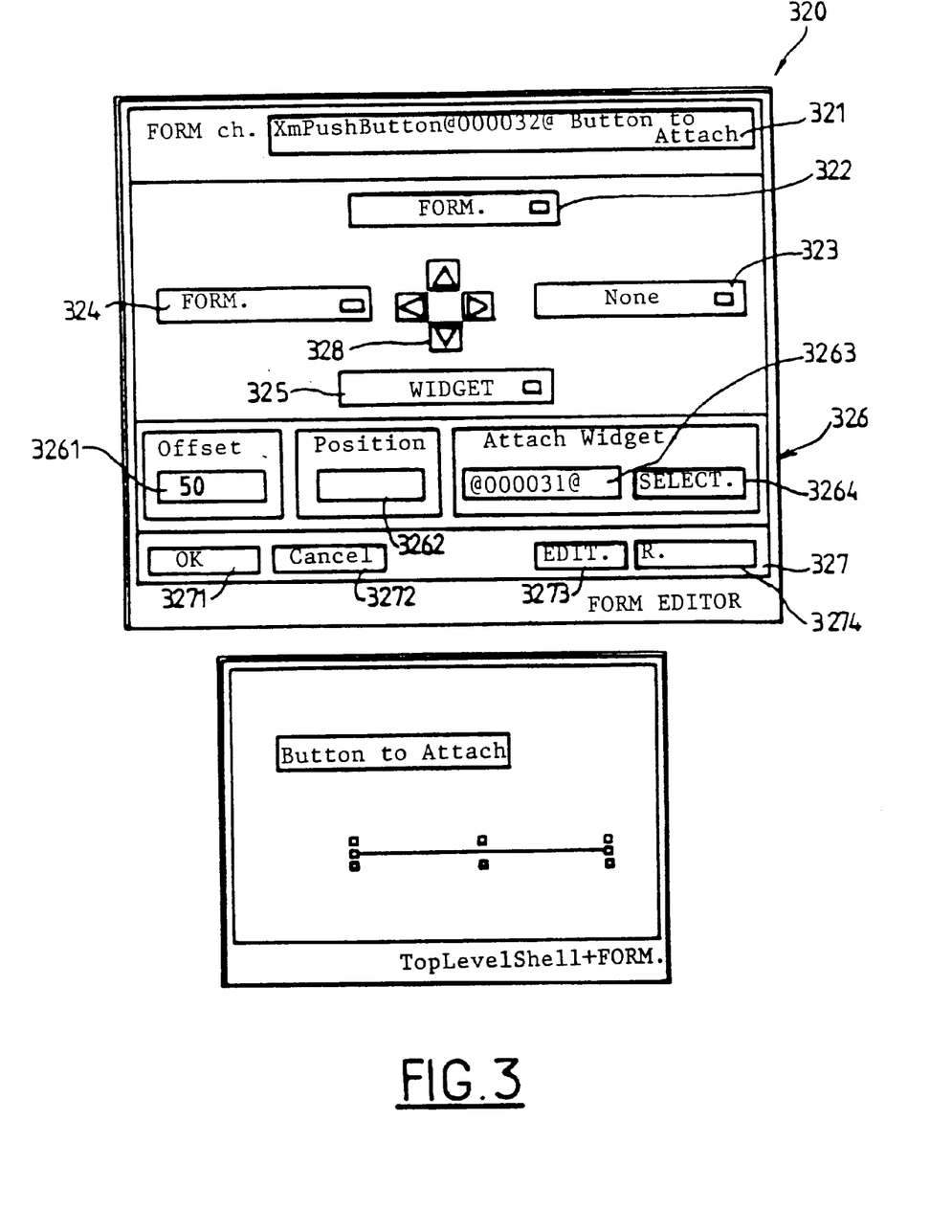
FIG. 3 represents a window that is displayed by the software of FIG. 1A that allows the shape of an object to be edited.

In FIG. 3 the behavior of a child of the FORM widget, for example, XmPushButton (321) is specified by giving the attachment value for the edges of the widget. These are designated as top (322), right (323), left (324) and bottom (325) respectively.

An attachment can be NONE (no attachment (323)), FORM (attachment with respect to the edge corresponding to the FORM (322,324)), POSITION (attachment proportional to the horizontal or vertical dimension of the FORM widget (3262)) or WIDGET (attachment corresponding to a child widget of the same FORM (325)).

It is possible to specify a supplementary offset distance (3261) with each attachment. This distance will correspond to the position specified in the editing area (3262).

FIG. 3 illustrates the "FORM EDITOR" in which four menus can be displayed in order to specify the attachment type of a given child widget. For each attachment, an interactive arrow (328) indicates which attachment is "current". The selection of any attachment will update the positioned attachment.

Figure 2:
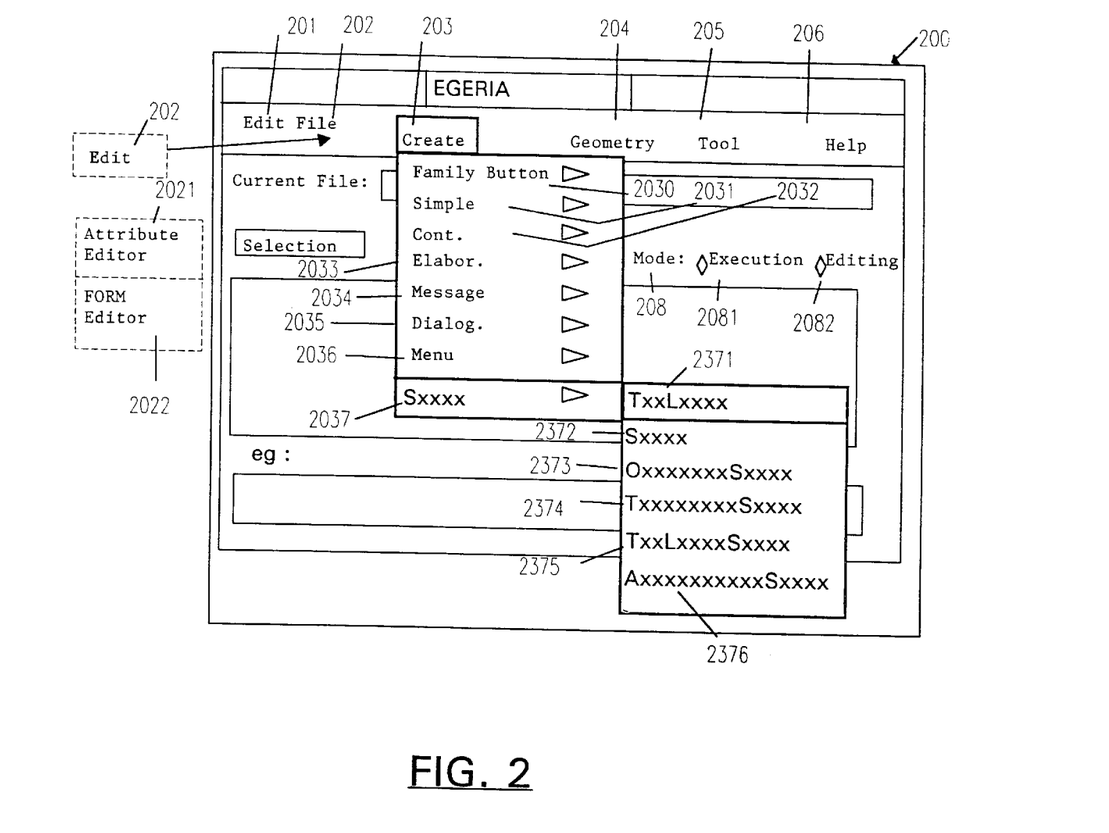
FIG. 2 represents the main window that is displayed by the software of FIG. 1A in order to describe an interface.

In order to edit a FORM child using this editor, the user selects the widget and uses the "FORM EDITOR" command (2022) which is activated from the "Edit" menu (202) as illustrated in FIG. 2. The widget's class, name and identifier appear in a text area (321) of the FORM EDITOR. This window will then display the characteristics of the widget that concern its behavior as a child of the FORM widget.

Two text areas describe the widget's offset (3261) and position (3262) (when the attachment is POSITION) corresponding to the current attachment. When the current attachment changes, these text areas are updated. When the attachment is not POSITION, the text areas labelled "position" are inactive and its title is shaded, as shown in FIG. 3.

It is possible to interactively move or resize the child widget with the mouse. In this event, the command is executed as if it had been sent from the FORM EDITOR and the text areas corresponding to the offset and/or to the position are updated.

The editor also allows the user to created elaborate objects ("widget" container) that are made up of several objects, but which are still considered to be simple objects. In other words, they can be cut and pasted in a single operation.

As illustrated in FIG. 2, all objects are created using the creation function "create" (203) in the main menu (200). This function allows the user to place an object inside an object container after selecting the object with a mouse click. This main menu (200) also includes the traditional functions "File" (201), "Help" (206) and the specific functions "EDIT", "CREATE", "GEOMETRY" and "TOOLS".

The appearance of the interface can be edited by using the mouse to change the size or the position of the "widgets" inside their container or by using formulas containing the different attributes of one or more objects. In other words, the "Edit" function (202) is used. This function allows the user to edit the attributes of parent objects of a selected object or to cut, paste, merge or copy a set of selected objects. Finally, this function allows the user to modify the geometry of the display by using the "geometry" function (204). This function allows the user to align a set of selected objects to the top, to the side or the base, or to vary the width or height of the set of objects.

As illustrated in FIG. 2, the "CREATE" menu (203) allows the user to choose between the different objects that are available in the X/MOTIF library. These objects are formed by a number of buttons (2030), a container (2032), an elaborate object (2033), a simple object (2031), a message type object (2034), a dialogue-type object (2035), a menu-type object (2036) and a container-type object ("Shell") (2037). When the Shell option is selected, a second menu appears in which the user can select the following attributes: maximum level (2371), shell (2372), override shell (2373), transient shell (2374), Top Level Shell (2375) or Application Shell (2376).

The attribute part is executed with a set of sub-editors. These sub-editors are automatically created by reading a description of the classes from the "X/MOTIF" library (11). There are three types of sub-editors: A sub-editor with a toggle button used to enter boolean attributes: a push button sub-editor that displays a menu for enumerated data; and a text area sub-editor for text and numerical values (such as those listed in Appendix 4, reference (436)).

By selecting the "Edit" function from the menu bar and then selecting the "Attribute Editor" (2021), the user can edit the attributes of a widget. This selection prompts the display of a cell-type window as illustrated in FIG. 4A.

Figure 4A:
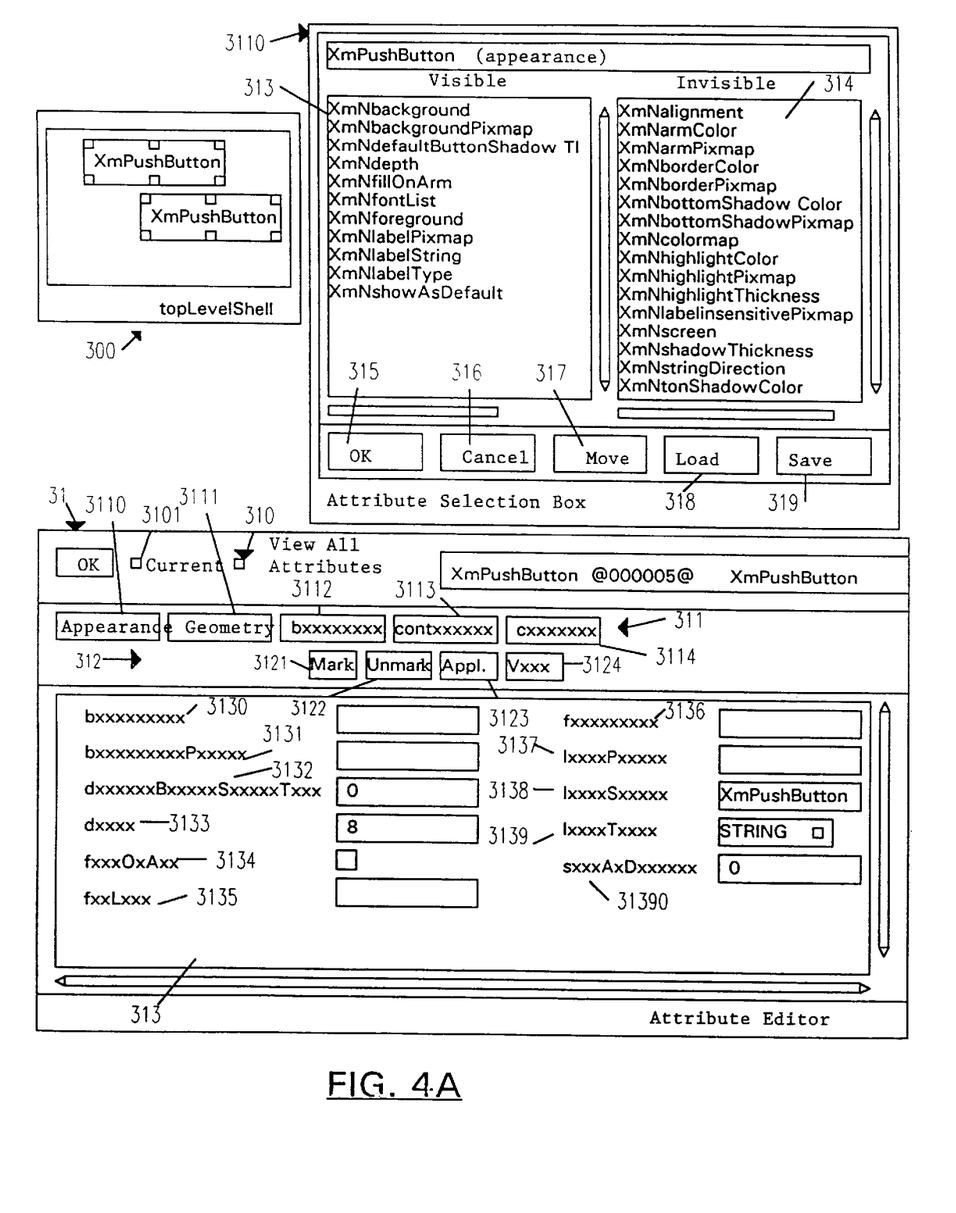
FIGS. 4A and 4B represent windows that are displayed by the software of FIG. 1A, that allows the attributes of an interactive object and the callback procedures to be edited.

The cell-type window (as illustrated in FIG. 4A) that includes a menu consisting of several overlapping parallel menus (311, 312) accessible using buttons (3110 to 3114 and 3121 to 3124) that act as a tab. Each menu sorts the attributes corresponding to a "widget" category. The categories are the following: appearance, activated with button 3110, geometry, activated with button 3111, behavior, activated with button 3112, constraints, activated with button 3113 and callback procedures, activated with button 3114. This allows the user to easily access a particular attribute among the numerous attributes provided by the X/MOTIF software.

In FIG. 4A, the menu button that corresponds to the appearance (3110) is illustrated near the other buttons (3111, 3112, 3113, 3114) as being pressed, or in the background. The appearance attribute editor, corresponding to the button shown in the foreground, has been activated by a mouse click in the button area and displays the corresponding window (313) in order to allow the user to edit the attributes. For FIG. 4A, this will be the window in which part 313 includes attributes that allow the user to define the appearance of the "widget" while editing. These attributes include a text area that allows the user to define the background in zone 3130, the background of the point matrix in zone 3131, the shading thickness of the default button in zone 3132, the depth in zone 3133, the list of character fonts in zone 3135, the foreground in zone 3136, the matrix point label in zone 3137, the string label in zone 3138 (shown here in the XmPushButton event) the label type in zone 3139, and the default appearance in zone 31390.

The attributes that are displayed in a window section are visible attributes that appear when the button labeled "current" (3101) is pressed.

Attributes are described in the traditional manner, by clicking the mouse when the arrow is in the desired attribute text area and by entering the text and numerical values using the keyboard. Once each attribute is defined, the selection button (3123) will activate the (Apply) command that allows the user to initiate global validation of all attributes that were modified during an iteration with the attribute editing sheet. When button 3122 is selected, the "unmark" command is activated. This command allows the user to cancel all changes made before a global validation. When selection button 3121 is selected, the "mark" command is activated and the user can validate the modifications without initiating a global validation.

When button 3124 is selected, the "view" command is activated. This command allows the user to send an attribute name from the list of visible attributes to the list of invisible attributes and vice-versa.

When this button (3124) is pressed by clicking the mouse when the arrow in the button area, it activates a display function of window 3110 in the middle of the attribute editor that allows the user to view the visual attributes shown in zone 313 and the invisible attributes shown in zone 314 of window 3110 at the same time.

This window (3110) also includes function buttons that allow the user to validate the selection using the OK button, to invalidate the selection of the changes made using button 316, to move an attribute from the visible area to the invisible area or vice-versa using button 317, to load the attributes using button 318 and to save the selection or the modifications that have been made using button 319.

An additional command (310) provided in the form of a radio button is available for the "view all attributes" button in the attribute editing form. This button allows the user to ignore the visibility specifications and to display all the attributes in window 313. When the current radio button (310) is selected, only those attributes having the visible specification are displayed in window 313.

Selecting the "geometry" menu, using button 3111, will activate an editing function that allows the user to display selection and modification attributes of a widget's geometry. The "behavior" menu, activated using button 3112, allows the user to activate an editing function that will display the attribute that defines a widget's behavior and what its behavior will be when using the attributes selected.

When button 3113 is selected, the constraint editing form is activated and the user can display the constraint attributes attached to a given object.

According to the object type, the editors are inactive.

For example, for push buttons whose attributes are defined in window 31, the constraint editing function and the global validation function are inactive. In this case, the title appears shaded, as illustrated for buttons 3113, 3123.

Finally, when button 3114 is selected, the user can activate the editing function of callback procedures.

Figure 4B:
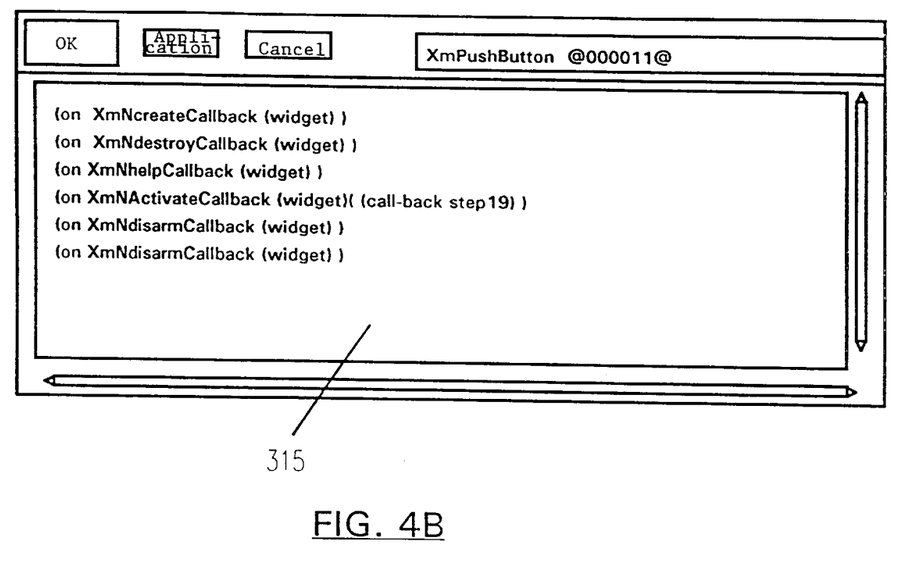

The callback procedure section is simply a text area in which the interactive "widget" callback procedures can be edited. This section is represented in a magnified view in FIG. 4B. Above the dialogue area for the callback procedures, there is a text box that allows the user to display information about the edited "widget", such as its name and reference number. One callback procedure is coded here in the WOOL language. A base model is given for each possible callback procedure of a "widget". For example, in order to edit the WOOL code that is executed when a push button is pressed, the base model is (on XmN activate callback (widget)). A pseudo callback (XmN create callback) has been added. This callback is called by EGERIA when an interface description (14) is loaded after all its child "widgets" that were created in the same description file have been created. Additional attributes can be created inside "XmN create callback".

When selecting parent objects (such as XmDrawingArea, which is the parent of XmFrame, XmLabel, XmScale and XmSeparator (ref. Appendix 4) it is not possible to directly edit the attributes of a "Shell" object or a "Top level widget" (XmTopLevelShell) general object. It is necessary to use the "Select parent" command and then activate the attribute editor.

Interactive objects ("widgets") that have been created, depend a lot on the current state of the X/defaults file. The names given to the objects can be used to set the default values of objects that are created, if the values have not been fixed by the editor. A minimum set of fixed default values that can be used by EGERIA may be those defined in the X/defaults file (13) (for example, see Appendix 1).

Using UNIX events, a translation table contained in the X/defaults file can also activate the internal EGERIA functions. Thus, one event (see (21) in Appendix 2) allows the user to select and move the widget(s) selected using the left mouse button. The "Egselect" button allows the user to select a "widget" under the pointer and the "EgMove" function allows the user to move the selected "widget". The left mouse button activates the "Shift" key at the same time and allows the user to add the designated object to the list of selected objects (see (22) in Appendix 2). In fact, the EgSelect or Unselect function allows the user to select or deselect an object designated by the pointer. This function works like a toggle. Finally, pressing the right mouse button, which activates the event (as indicated by (23) in Appendix 2), will activate (in UNIX) the EgSetSelect function that allows the user to draw an interactive rectangle and to select objects situated inside the rectangle. The rectangular zone is defined by two corners, the place where the button is pressed and the place where the button is released.

A second minimal translation (refer to Appendix 3), is also installed in the X/Defaults file in order to allow the user to activate the main editing functions using the keyboard. This table calls the Eg WOOL Exec function that activates an expression written in the WOOL language. This expression is the value of the atom given as an argument. The atoms are prefixed with the term "custom:"and are defined in the Edcustom.G file. This is the standard method of personalizing the behavior of the base editor.

Figure 5:
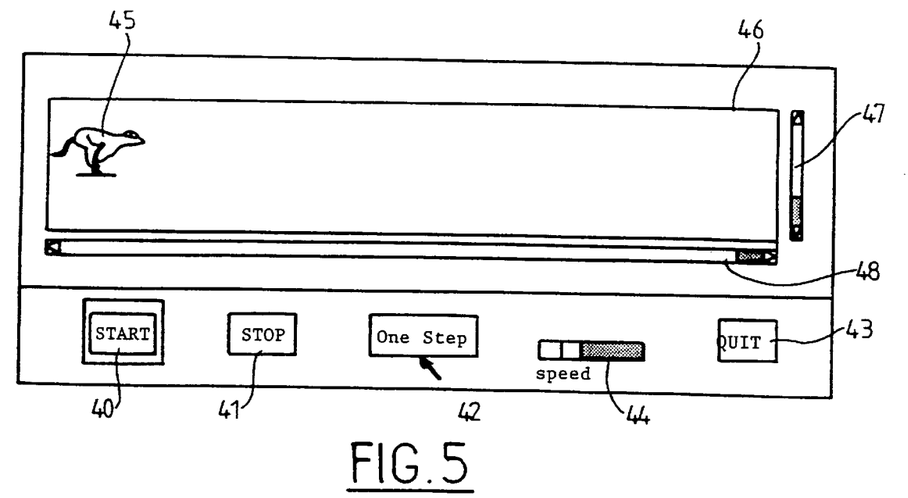
FIG. 5 represents the window defined by an application that is unique to the interface description software of FIG. 1A.

An example application of the interface editor is given below with reference to FIGS. 1 to 4. This example illustrates the edition of an interface that allows the user to display (as shown in FIG. 5) a dog (45) in the process of running. The dog can be moved one step by pressing the "one step" button (42). The dog is started by pressing the "Start" button (40) and the application can be terminated by pressing the "Quit" button (43). The speed of the dog can be selected using a sliding potentiometer (44) and the dog can be stopped using the "stop" button (41).

This application will include several stored images in the "Pixmap pdog" (refer to (52) in Appendix 5) memory that will be displayed by moving them into the drawing area. In order to edit the interface, the "widgets" must first be created using the "create" menu. First, a "widget Shell" must be created. In our example this "widget Shell" will be a general "top level" widget or XmToplevelShell (see (40), Appendix 4) that has "@000001@" as an identifier, "eg:widget-root" as a parent and an additional object (see (41), Appendix 4) "DrawingArea". Next, the other "widgets" are created. All of these "widgets" will have an identifier, attributes, an eventual name in EGERIA "eg:name" (for example: "speed-widget" (4510) in Appendix 4) and an eventual script (for example, the script (470) for the "quit" push button (47), as indicated in Appendix 4).

Each time a "widget" is created, the editor will ask the user to indicate the parent and the position. We will create a "DrawingArea" containing scroll bars (see (47, 48) Appendix 4) where the application will draw the dog inside a scrolled window (46) that is defined in by the "XmScrolledWindow" (object (see (462), in Appendix 4). In order to create objects, the editor uses the customary functions—cut, paste and copy. The list of created or selected objects is manipulated using the left button which allows the user to select or to move the "widget(s)". The left button also allows the user to add the designated object to the list of selected objects when the "Shift" key is pressed. The right mouse button allows the user to select all "widgets" inside a rectangular zone. This zone is defined by two corners according to the place where the button is pressed and the place where it is released. By using the "select parent" operation from the "edit" menu, the "widget" that is selected becomes the parent of the "widget" that was selected. This operation is indispensable, since it allows the user to select a "widget" that is hidden by its child(ren), for example, a parent or a menu. When an object is selected, its class, identification number and eventually its name appear in EGERIA's main window as shown in FIG. 2.

The sizes and positions of "widgets" can be changed using the mouse. The left mouse button is used to select and move the selected "widget(s)". This causes the events to intervene as described above (see (21), Appendix 2).

The right mouse button is used to draw a rectangle in which the objects will be selected and causes the commands described above to intervene (see (23), Appendix 2). The middle mouse button is used to change the size of one or more "widgets" (see (24), Appendix 2).

It is also possible to change the position and the size of several objects at the same time using the operations in the "geometry" menu. This menu includes an "align" operation that allows the user to move selected objects so that they are aligned on the same vertical to the left, to the right, to the center or on the same horizontal to the top, to the bottom or to the center.

The "Resize" operation in the "Geometry" menu allows the user to give the same width and height to selected objects or a minimum or maximum size. The "Distribute" operation allows the user to distribute the selected objects at a regular interval. They can be distributed horizontally or vertically using the rectangle comprising them or inside of their parent.

The editing attributes are used by selected the "Attribute" operation (2021) from the "Edit" menu. This operation allows the user to open a data sheet containing all of the attributes illustrated in FIG. 4A.

Certain attributes cannot be modified after the "widget" has been created. This is the case for the XmscrollingPolicy and XmNscrollBarDisplayPolicy attributes.

We have used the word "script" to designate the code that describes the response to the set of callbacks. The scripts associated to each "widget" are written in WOOL and are described below.

The "Quit" push button allows the user to exit the application. In order for the button to react by calling the "exit" function, as a reaction to the "XmNactivateCallback" message, the following must be included in the script:

(on XmNactivateCallback(widget) (exit)).

Please note that the "widget" parameter is available. This parameter indicates the "widget" that is currently active (in this case, this is the "Quit" push button). The call_data parameter is not available.

the "step" push button makes the dog advance one step. In order for the button to react to the message "XmNactivateCallback" by calling the "step" callback, defined in the application, the following must be included in the script:

(on XmNactivateCallback ("widget" (call-back dog:step 19))

Once number 19 has been reached, the program will be in the client_data parameter of the C callback corresponding to the "StepCallback" (see (525), Appendix 5). Using the C:intmovement=(int) client-data (see (526), Appendix 5) instruction it indicates how many pixels the dog should be moved. The C function corresponding to "DrawCallback" (see (523), Appendix 5) in order to draw the dog will be presented later.

The dog is drawn in the drawing area and is redrawn as many times as necessary by calling the draw callback defined in the application:

(On XmNexposeCallback (widget) (call-back draw))

(see (430), Appendix 4)

When this "widget" is created, the application can be initialized by calling the init function using the "call-back init" (see (4311), Appendix 4) instruction. This instruction defines the application callbacks "draw" and "step" by calling the C code "InitCallback(widget,client-data,call-data") and "InitPixmaps" and loads the pixmaps corresponding to the different positions of the dog using the "InitPixmaps" procedure. Moreover, the size of the drawing area is defined in the window-width variable so that the step function makes the dog restart from the left side each time it leaves the right side of the drawing area.

(on XmNcreateCallback ("widget") (call-back init)

(setq window-width (attribute-get "widget" XmNwidth)))

(see (431), Appendix 4)

The window-width variable is updated each time the length of the "widget" is changed with the WOOL instruction:

(on XmNresizeCallback ("widget")

(setq window-width (attribute-get "widget" XmNwidth)))

(see (433), Appendix 4)

Finally, each widget drawing area (ref. (434), Appendix 4) is given a name in order to identify it in the C code where the pixmaps are created. This is accomplished using the EgVariableGetCValue ("drawing-area". . . ) function (see (522), Appendix 5). It would have been easier to send the "widget" to the init parameter, but using this method the user will be able to see (later on) how a LISP variable is consulted from C.

The "Start" push button makes the dog run. This is accomplished using the work-proc (ref. (441), Appendix 4) function. This function stores an expression that is evaluated each time there is no processing event coming from X. This expression must be evaluated quickly. In our example, it increments a counter (ref. (4411), Appendix 4) and advances the dog using the step function (ref. (4412) or (4413), Appendix 4) when a given value is reached. The increment is the value of a "widget" scale (see (451), Appendix 4) identified by a number that is controlled by EGERIA (here @000010@). A "widget's" identifier is displayed when it is selected. It can easily be copied and pasted and its class and eventually its name are displayed.

```
(on XmNactivateCallback ("widget")
  (work-proc
    ' (progn
      (setq count  (+ count
                     (attribute-get @000010@ XmNint-value)))
      (if (> count 100)
          (setq count (- count 100))
          (call-back step 19))))))
```

It must be noted that the attribute consulted is XmNintvalue and not XmNvalue. This removes any ambiguity due to the fact that (in WOOL), XmNvalue (for MOTIF) designates an integer for a XmScale and a character string for XmText.

In this last case, XmNString-value must be used.

The counter is initialized when the "widget" is created:

```
(on XmNcreateCallback (widget) (setq count 0))
```

The "Stop" push button allows the user to stop the dog-track. This is also accomplished by calling the workproc (see (442), Appendix 4):

```
(on XmNactivateCallback (widget) (work-proc()))
```

A backup of the interface is made using the "Save" command from the "File" menu. Afterwards, the saved file can be reloaded using the "Load" command. A few comments concerning the conventions of names must be noted:

Files belonging to EGERIA are prefixed with (eg-). It is advisable to give the file containing the application interface the name of this application with the par.eg suffix. In our example, we call the interface generated by EGERIA "dog.eg", where dog is the executable file.

If this is not convenient, the name of the file to be loaded in the application's C-source code must be indicated (in a parameter of the EgMain function).

The rest of the application is written in the C language. All the libraries that are used are also written in C (see Appendix 5). If this language is C++, then file modifications are required. For any other language, the description files of the different types, constants and functions must be generated.

The complete source code of the example dog.c is in Appendix 5. In the next few paragraphs we will present only the main elements of this example.

First of all, a description of the toolkit must be included. EGERIA provides the "eg_toolkit.h" file that contains all the published declarations of the MOTIF "toolkit" (see (50), Appendix 5).

include "eg_toolkit.h".

Then the EGERIA declarations must be included. Thus, the available functions are described in the reference manual:

include "egeria.h".

Execution control is given to EGERIA using the EgMain function (see (511), Appendix 5).

EgMain(layers, XtNumber(layers),
  argc, argv, options, XtNumber(options),
  MODE_EXECUTION
  InitCallback,
  NULL,
  Null, "EGPATH")

The most important parameter, InitCallback (ref. (5110), Appendix 5) records the callback that initializes the application and records the other callbacks. This callback is called from the interface using (callback init).

It is advisable to rework the sample code given in dog.C. Only the callbacks will be changed for other applications.

The EgMain function and its parameters allow the user to make the necessary initializations and then call "EgAppMainLoop", which loops after calling XtAppNextEvent and EgDispatchEvent.

The callback InitCallback has two roles: to initialize the application and record the links between the interface and the application.

For the application, in our example, pixmaps are created that correspond to the different steps of the dog track in the InitPixmaps function.

For links, the callbacks "DrawCallback" and "StepCallback" are recorded with the application under the names "draw" and "step" because of the EgCallbackDefine function. Also a somewhat unique window-width LISP variable is used because it will share the address with the C windowwidth variable.

```
void
InitCallback(widget, client_data, call_data)
    Widget widget;          /* UNUSED */
    caddr_t client_data;    /* UNUSED */
    caddr_t call_data;      /* UNUSED */
{
    InitPixmaps();
    EgCallbackDefine("Draw", DrawCallback);
    EgCallbackDefine("step", StepCallback);
    EgPointerDefine("window-width", &windowWidth);
}
void
DrawCallback(widget, client_data, call_data)
    Widget widget;          /* UNUSED */
    caddr_t client_data;    /* UNUSED */
    caddr_t call_data;      /* UNUSED */
{
    XCopyArea(DISPLAY,pdog[current],drawingAreaWindow,
        gc, 0, 0, wdog[current], Hdog[current]
        xdog, ydog);
}
void
StepCallback(widget, client_data, call_data)
    Widget widget;          /* UNUSED */
    caddr_t client_data;    /* UNUSED */
    caddr_t call_data;      /* UNUSED */
{
    int movement = (int) client_data;
    XClearArea(DISPLAY, drawingAreaWindow,
        xdog, ydog, WIDTH, HEIGHT, False),
    xdog += movement;
    if (movement > 0 ){
        if (xdog >= windowWidth) xdog = 0;
        current++;
        if (current > 5) current =0;
    } else{
        if (xdog < a) xdog = windowWidth;
        current—;
        if(current < 0) current = 5;
    }
    XCopyArea(DISPLAY, pdog[current], drawingAreaWindow,
        gc, 0, 0, wdog[current], hdog[current],
        xdog, ydog);
}
```

The pixmaps are created in the InitPixmaps function. In order to do this, it is necessary to know in which widget they will be designed. Therefore, the LISP drawing-area variable is consulted.

```
if (!EgvariableGetValue("drawing-area",
                       egClassWidget,
                       &drawingArea)) {
    fprintf(stderr,
        "drawing area must be specified\n");
    exit (−1);
```

The value of a LISP variable can also be changed in C. It must be noted that this method is found in other systems that are not necessarily based on a LISP interpreter. This means that an application that uses these functionalities is not dependant on EGERIA.

After the application has been compiled, link editing with the EGERIA library libEg.a and with the libraries required by OSF/MOTIF (libXm.a, libxt.a and libX11.a) must be completed.

The resulting program allows the user to edit the interface if it is executed before the -edit option:

```
EGPATH=.:/user/local/lib/X11/eg dog -edit&.
```

All changes or modifications within reach of craftsmen are an integral part of the spirit of this invention.

What is claimed is:

1. An interactive interface description tool, said interactive tool comprising:
   an interface description program enabling the generation of an interface;
   an interpreted language;
   and an object oriented interpreter for said interpreted language embedded within said interface description program wherein said interpreter includes a kernel organized in a two-dimensional matrix, a first dimension of said matrix containing lists, strings and numbers and a second dimension of said matrix containing function selectors and wherein said interface description program works with a library of objects.

2. The interactive tool described in claim 1, wherein a similar representation scheme is used for data and for programs.

3. The interactive tool described in claim 1, wherein said interpreter uses arrays.

4. The interactive tool described in claim 1, wherein said interactive interface description tool further comprises a program that allows a user to display a base menu for invoking an edit function, a create function and a geometry function.

5. The interactive tool described in claim 4, wherein the edit function allows the user to edit interactive object attributes in a separate window, as well as edit attributes of respective interactive parent objects.

6. The interactive tool described in claim 5, wherein the edit function allows the user to display an editing window for interactive object attributes, said window divided into two areas a first of said areas including called functions of a callback application procedure, and a second of said areas including attributes displayed by a set of sub-editors associated with said edit function.

7. The interactive tool described in claim 5, wherein the selection of the attribute editor in the edit function prompts the display of a cell type window that includes a menu consisting of several over-lapping parallel menus, each menu sorting the attribute corresponding to a category to allow a user to easily access a particular attribute, the category selected from the group consisting of: appearance, geometry, behavior, constraints and callback procedures.

8. A method of executing an interface description file provided by an interactive interface description tool, said interface description file working with a library of interactive objects, a library of command objects, a library of graphical objects and an object-oriented "LISPI" interpreter, the interpreter including a kernel organized as a two-dimensional matrix having a first dimension containing lists and strings and having a second dimension containing function selectors and wherein the interpreter loads and executes the interface description file as a program in the interpreted language in order to reconstruct the application interface and then interpret all the events that arise from the library of interactive command objects.

9. The method described in claim 8, wherein said interface description file is stored as an interpreted object oriented language program.

10. The method described in claim 9, wherein said interface description program is expanded by adding interactive objects executed by describing said object attribute types in said interpreted language to make each of said interactive tools ("widgets") editable.

11. An interactive interface description tool comprising:
    a library of interactive objects;
    a library of command objects;
    a library of graphical objects;
    an interface description program enabling the generation of an interface;
    an interpreted language;
    an interpreter for said interpreted language embedded within said interface description program, wherein said interface description program works with said library of interactive objects, said library of command objects, and said library of graphical objects, and is expanded by adding interactive objects executed by describing said object attribute types in said interpreted language to make each of said interactive objects editable and wherein each of said interactive objects identified by a respective object in said interpreted language has supplementary attributes directly attached to said interpreted language object; and
    wherein an edited interface description file is stored as an interpreted language program.

12. The interactive tool described in claim 11, wherein each object in the interpreted language is an auto-typed structure written in the C language that contains object type and reference counter information.

* * * * *

UNITED STATES PATENT AND TRADEMARK OFFICE
CERTIFICATE OF CORRECTION

PATENT NO    : 5,974,253
DATED        : October 26, 1999
INVENTOR(S)  : Colas Nahaboo, et al.

It is certified that error appears in the above-identified patent and that said Letters Patent are hereby corrected as shown below:

Column 4, line 47, "(onXmactivateCallback", should read --(on XmNactivateCallback--;

Column 7, line 55, "created", should read --create--;

Column 8, line 26, ":", should be --;--;

Column 8, line 35, delete "that";

Column 11, line 7, delete "in";

Column 13, line 15, before "It must be noted", insert --(see (441), Appendix 4)--;

Column 15, line 18, "libxt.a", should read --libXt.a--; and

Column 16, line 15, "LISPI", should read --LISP--.

Signed and Sealed this

Twenty-second Day of May, 2001

*Attest:*

NICHOLAS P. GODICI

*Attesting Officer*     *Acting Director of the United States Patent and Trademark Office*